May 30, 1950            A. E. CHURCH            2,509,673
FLUID PRESSURE OPERATED CHUCK
Filed May 15, 1947
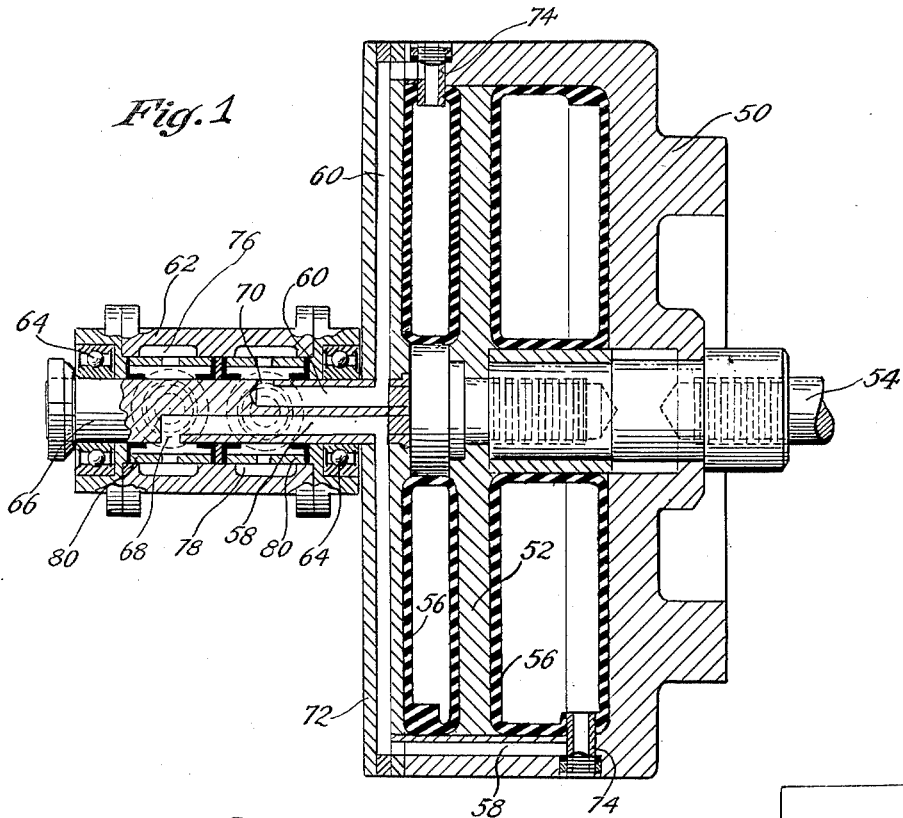
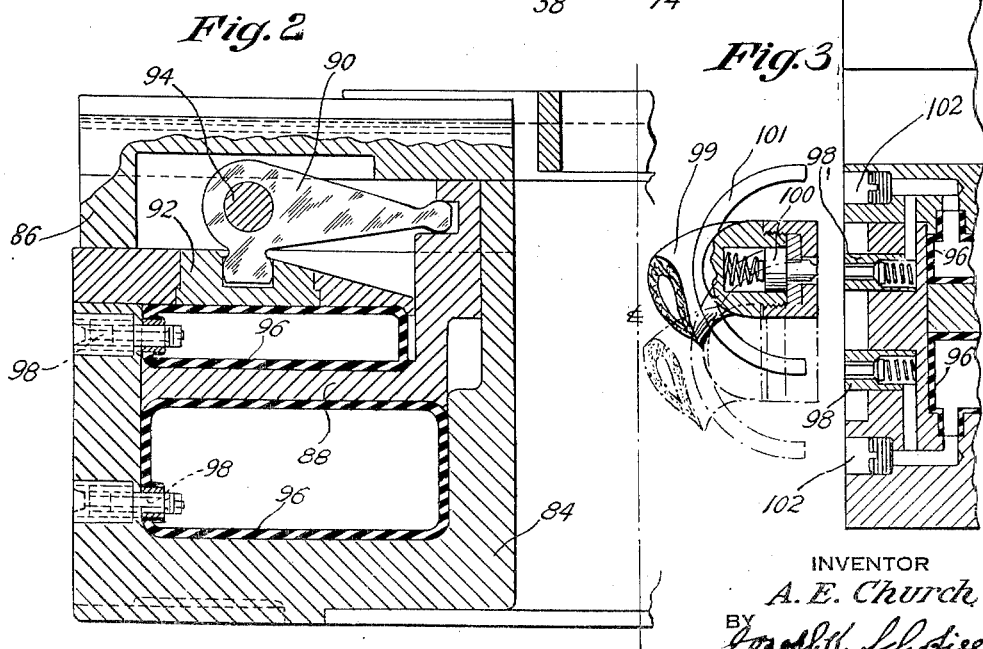
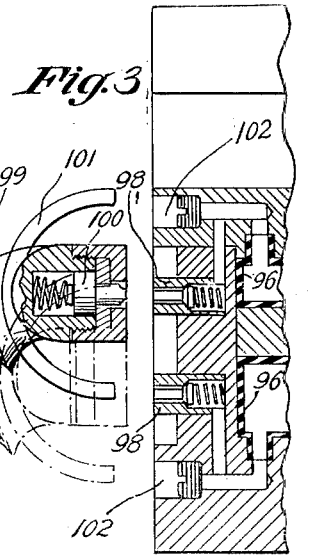
INVENTOR
A. E. Church
BY Joseph H. Schofield
ATTORNEY Patented May 30, 1950

2,509,673

UNITED STATES PATENT OFFICE 2,509,673

FLUID PRESSURE OPERATED CHUCK

Albert E. Church, New Britain, Conn., assignor to Union Manufacturing Company, New Britain, Conn., a corporation of Connecticut Application May 15, 1947, Serial No. 748,314

5 Claims. (Cl. 279—4)

This invention relates to chucks and more particularly to chucks having their jaws actuated in closing or in closing and opening directions by means of air or other fluid pressure acting on a piston operatively connected to the jaws.

An object of the present invention is to provide a powerful jaw closing mechanism for chucks which may be conveniently actuated by admitting fluid under pressure to an expansion member within the chuck body or within an actuating member therefor.

Another object of the invention is to provide a pressure tight expansible member housed within the chuck body having means to admit fluid such as air thereto, expansion of the member serving to actuate a piston within the chuck body in one direction, or to provide opposed expansion members to actuate the piston in opposite directions.

And finally it is an object of the invention to provide a bell-crank lever or wedge type connection between the jaws and the piston so that a relatively long traverse of the piston will produce a relatively short but powerful movement of the jaws.

A feature of importance of the invention is that by admitting fluid under pressure to one or the other of the opposed expansion members which preferably are of annular form, a centrally and axially movable piston within the chuck or an actuating member therefor is moved in one or the other direction and bell-crank levers or wedges, each operatively connected to the piston and connected to the jaws, are oscillated to radially actuate the jaws.

Another feature of the invention is that a single expansible member may be employed to actuate the jaws in one direction and one or more springs acting on the piston may be used to actuate the jaws in the opposite direction.

Another object of importance is that the jaw actuating levers such as bell-cranks or other form of levers, when the jaws moved thereby are in their work clamping position, may be, if desired, self-locking, so that failure of the fluid pressure will not cause the jaws to open and release the work.

And finally it is a feature of importance that the jaw actuating bell-cranks have the ends of their long arms in engagement with the central piston to be moved thereby, the short arms having their ends pivotally retained in fixed positions within the chuck body, the intermediate portions of the bell-cranks being individually connected by suitable pivotal means to the radially movable jaws.

With the above and other objects in view, the invention may include the features of construction and operation set forth in the following specification and illustrated in the accompanying drawings.

In the accompanying drawings annexed hereto and forming a part of this specification, I have shown the invention embodied in several different forms of chucks but it will be understood that the invention can be otherwise embodied and that the drawings are not to be construed as defining or limiting the scope of the invention, the claims appended to this specification being relied upon for that purpose.

In the drawings:

Fig. 1 is a central sectional view of the actuating means for a rotating type chuck having expansible members to which air or other fluid under pressure may be admitted to actuate the chuck jaws (not shown) in opposite directions.

Fig. 2 is a half sectional view of a rotating type of chuck having opposed expansible members for actuating the chuck jaws in opposite direction, and Fig. 3 is an enlarged view of a portion of Fig. 2 showing a fluid admitting member adaptable for controlling the inflating of one expansible member and the deflating of the other.

In the above mentioned drawings there have been shown several embodiments of the invention which are now deemed preferable, but it is to be understood that changes and modifications may be made within the scope of the appended claims without departing from the spirit of the invention.

Briefly, and in its preferred aspect, the invention may include the following principal parts: First, a body member having means mounting it for rotation on a spindle or for operation in fixed position on a table or other support; second, radially movable jaws slidable within the body member; third, a central axially movable piston within the body member; fourth, one or more expansible members of annular form within the body member and in contact with a portion of the piston; fifth, means to admit air or other fluid under pressure to said member or members; and sixth, bell-crank or other link means connecting said jaws and piston.

Referring now to Fig. 1 of the drawings, it will be seen that the actuating head 50 for a rotatably mounted chuck is shown adaptable for any type of chuck (not shown). The head portion is adapted for attachment to the tail end of a machine tool spindle for rotation therewith. The body member 50 is hollow and within it slides a piston 52 attached to a central pull rod 54 by means of which a standard form of chuck mounted on the spindle may have its jaws actuated.

Within the body member 50 and disposed on opposite sides of the piston 52 are expansible members 56 of annular form. One of these members 56 is shown expanded and the other contracted. To admit fluid under pressure individually to these members 56 separate conduits 58 and 60 are provided leading from a supply connected into a member 62 rotatably mounted relative to the body member 50. For this purpose the supply member 62 for the fluid is mounted on anti-friction bearings 64 supported on a central hub extension member 66 attached to the back plate 72 of the body member 50. As shown, the conduits 58 and 60 are provided in this hub extension member having lateral openings 68 and 70 for admitting the fluid from the supply. Exit openings for these conduits 58 and 60 lead to radially extending conduits forming parts of conduits 58 and 60 within a back plate 72 forming part of the body member. From the peripheral ends of these radial conduits the fluid is admitted through suitable nipples 74 to the interior of the expansible members 56. As indicated in Fig. 1 two sources of supply of fluid are shown each leading to one of the annular spaces 76 or 78 within the supply member 62. To form these separated supply chambers, sleeves 80 are secured in alined positions within this member 62. From the above description it will be seen that by suitable valves attached to the supply chambers 76 and 78 fluid under pressure may be admitted to the interior of either of the expansible members 56. Piston 52 may therefore be actuated axially within the body member and the pull rod 54 for opening and closing the jaws of a chuck or other device will also be moved.

Referring to Fig. 2, a double acting chuck is partially shown. In this figure a body member 84, a part only of which is shown, is provided with chuck jaws 86, one only of which is shown. Within the chuck body is a piston 88 generally similar to the piston shown in Fig. 1. Bell-cranks 90 have one end engaging an annular groove provided in the hub extension of the piston 84 and their opposite and shorter ends are engaged within a recess provided within plugs 92 fitted into a top plate forming part of the body member. Their intermediate portions are pivotally attached by cross pins 94 to the chuck jaws 86.

To actuate the piston 88, expansible impervious members 96 are provided, one disposed on either side of the piston 88. To admit air under pressure individually to these members 96 self-closing valve nipples 98 may be provided individually connected to suitable sources of fluid under pressure. In Fig. 3 is shown a detail view of the fluid admitting connections for the members 96. Valve nipples 98 are provided with spring closed valves having their valve casings connected by suitable individual conduits to the members 96. These conduits may be direct as shown in Fig. 2 or preferably as shown in Fig. 3. In Fig. 3 is shown a fluid supply in the form of a flexible tube 99 having a self-closing valve 100 at its free end. A yoke member 101 is attached to this end of the tube, the ends being spaced from the valve 100 and on opposite sides of the valve.

By applying the tube 99 with its valve 100 against one of the nipple valves 98, one of the inflatable members will be expanded. Simultaneously with the valve 100 being positioned against one of the nipple valves, an end of the yoke member projects into the other nipple valve and holds it in its open position. While fluid is being admitted to one expansible member 96, fluid will be simultaneously exhausted from the other member 96. In either operative position of the tube 99 and valve 100 the end of the yoke member opposite that entering a nipple 98 enters one of the depressions 102 closed by suitable threaded plugs. These depressions are formed by the drilling to form the conduits from the nipple valves to the inflatable members 96.

What I claim is:

1. A chuck operating mechanism comprising a body member, having a plurality of jaws movable therein, a piston slidably mounted within said body member, an impervious, flexible and expansible member on one side of said piston housed within said body member, means to admit fluid under pressure to within said member to move the piston, and bell-cranks having their arms connected respectively to said piston and body member and their intermediate portions pivotally connected to said jaws, whereby movement of said piston will actuate said jaws.

2. A chuck operating mechanism comprising a body member having movable jaws therein, a piston axially movable within said body member, means operatively connecting said piston and jaws, impervious, flexible and expansible members disposed on opposite sides of said piston and housed within said body member, self-closing valves for said expansible members, and means attachable to said valves to simultaneously admit fluid under pressure to one of said expansible and exhaust fluid from the other expansible member, whereby said piston and jaws may be moved in opposite directions.

3. A chuck operating mechanism comprising a body member having movable jaws therein, a piston axially movable within said body member, means operatively connecting said piston and jaws, expansible and flexible pressure tight members disposed on opposite sides of said piston and housed within said body member, fluid admitting valves for said expansible members, and means adapted to simultaneously open said valves, whereby fluid under pressure may be admitted to one expansible member and exhausted from the other, whereby said piston and jaws may be moved in opposite directions.

4. A chuck operating mechanism comprising a body member having movable jaws therein, a piston axially movable within said body member, levers operatively connecting said piston and jaws, expansible and flexible pressure tight members disposed on opposite sides of said piston and housed within said body member, means to admit fluid under pressure to one of said expansible members and exhaust fluid from the other member, whereby said piston and jaws may be moved in opposite directions, movement of the piston in one direction actuating said levers to a self-locking and work-clamping position.

5. A chuck operating mechanism comprising a body member having movable jaws therein, a piston axially movable within said body member, bell-crank levers operatively connecting said piston and jaws, expansible and flexible pressure tight members disposed on opposite sides of said piston and housed within said body member, means detachable relative to said body member to simultaneously admit fluid to one expansible member and permit exhaust of fluid from the other member, whereby said piston and jaws may be moved in opposite directions, movement of the piston in one direction actuating said bell-crank levers to a self-locking and work-clamping position.

ALBERT E. CHURCH.

REFERENCES CITED

The following references are of record in the file of this patent:

UNITED STATES PATENTS

| Number | Name | Date |
|---|---|---|
| 926,761 | Oliver | July 6, 1909 |
| 1,406,451 | Elvers | Feb. 14, 1922 |
| 1,613,090 | Fornaca | Jan. 4, 1927 |
| 1,851,723 | Neidow | Mar. 29, 1932 |
| 1,934,411 | Dahlman | Nov. 7, 1933 |
| 2,267,815 | Bush | Dec. 30, 1941 |
| 2,386,313 | Hollerith | Oct. 9, 1945 |
| 2,394,311 | Keller | Feb. 5, 1946 |

FOREIGN PATENTS

| Number | Country | Date |
|---|---|---|
| 500,678 | France | June 3, 1919 |